United States Patent Office 3,476,018
Patented Nov. 4, 1969

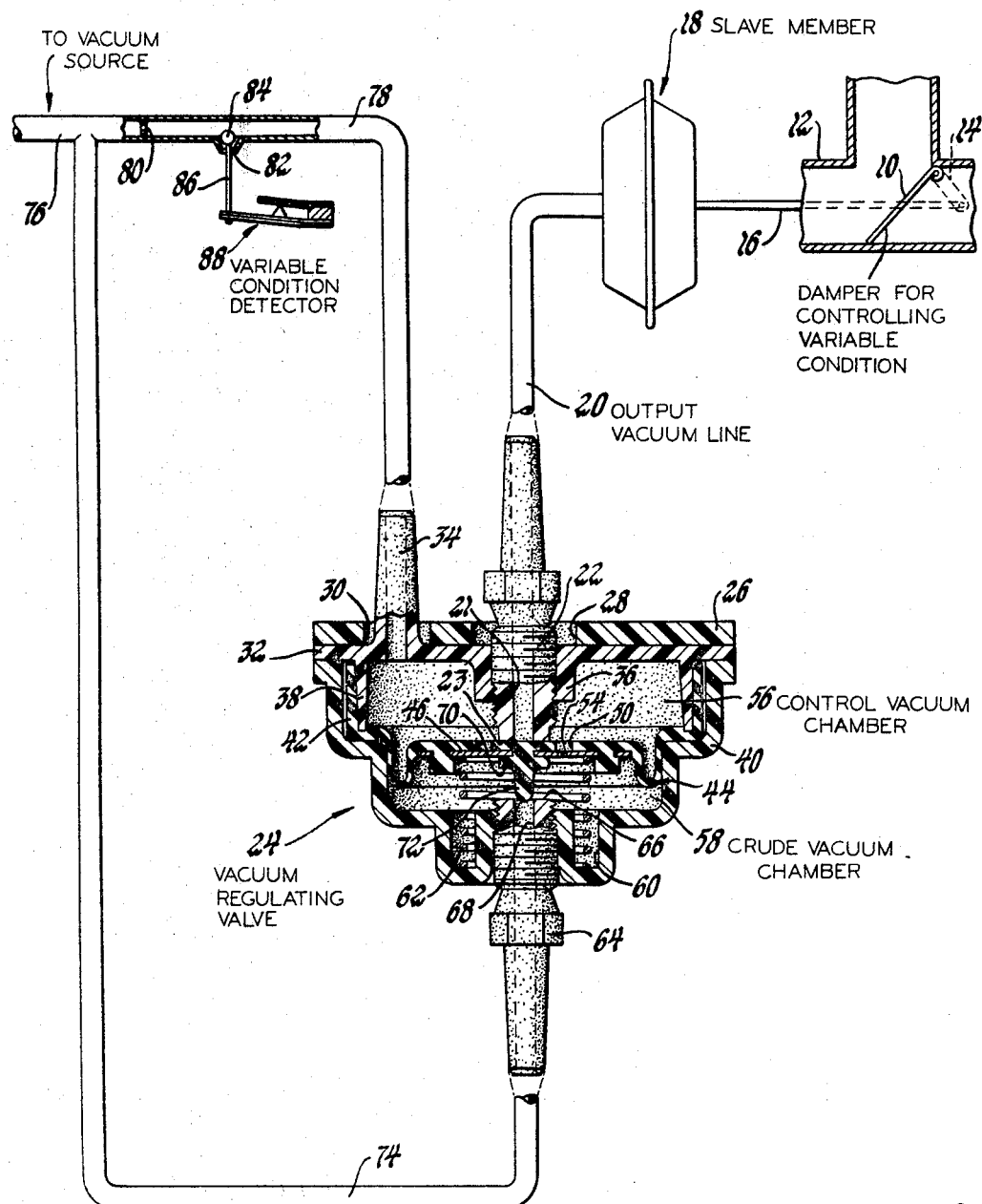

3,476,018
VACUUM CONTROL SYSTEM
Paul K. Beatenbough, Medina, and Gary E. Richards, Lockport, N.Y., assignors to General Motors Corporation, Detroit, Mich., a corporation of Delaware
Filed Nov. 1, 1967, Ser. No. 679,905
Int. Cl. F15b 11/10, 13/04; G05d 23/12
U.S. Cl. 91—419
2 Claims

ABSTRACT OF THE DISCLOSURE

A vacuum system suitable for use in controlling the temperature of an automobile passenger compartment, the vacuum being modulated in accordance with that temperature and a special regulating valve having a bleed aperture in its diaphragm valve member being employed preventing fluctuation in the modulated temperature when the supply of crude vacuum varies at times such as during vehicle acceleration.

---

This invention pertains to a control system and more particularly to a vacuum control system employing a slave member effective in controlling a condition and operated by a vacuum variable with that condition so compensation for the variation is automatic.

Two control systems employing engine intake manifold vacuum for programming, maintaining or modifying conditions such as temperature of automobile passenger compartments are disclosed in the U.S. patent applications Ser. No. 611,928 filed Jan. 26, 1967, in the names of W. H. Kolbe and E. W. Yott, now U.S. Patent No. 3,373,934, and Ser. No. 636,212 filed May 4, 1967, now U.S. Patent No. 3,416,408 in the name of R. D. Freiberger. Each of these systems operates admirably but it has been found that if the supply of crude vacuum, as taken from the engine intake manifold, varies due to some condition such as vehicle acceleration or heavy load on the vehicle engine there is sometimes an undesirable response in the control vacuum and therefore an undesirable action on the part of a slave member or spring loaded motor supposedly effective in accurately compensating for undesired changes in the passenger compartment conditions.

The regulating relay valve of the application Serial No. 636,212 does not fully counteract fluctuations in the degree of actuating vacuum applied to the motor and the relay valve operates differently as compared with the regulating valve herein disclosed. The vacuum relay valve of the application Serial No. 611,928, on the other hand, superficially appears more similar to the present regulating valve herein shown but the latter exhibits different functioning as well as improved performance.

An object of the present invention is to provide an improved control system in which a slave member may be actuated to correct or compensate for a variation in a condition such as temperature and to do so by means of vacuum which is accurately controlled despite variations in the crude vacuum supply.

A feature of the present invention is a vacuum control system including a vacuum regulating valve having two vacuum chambers separated by an aperatured flexible diaphragm adapted to be acted upon by crude vacuum tending to urge the diaphragm in one direction and against spring loading to increase vacuum output to a slave member and by controlled vacuum tending to urge the diaphragm in the opposite direction to shut off or reduce the vacuum output.

This and other important features of the invention will now be described in detail and then pointed out more particularly in the appended claims.

The sole figure in the drawing is a diagrammatic presentation of a control system embodying the present invention and employing a novel vacuum regulating valve, with portions being shown in section.

A damper 10 is shown in three-way duct work 12 whereby hot air and cool air may be proportioned to gain a desired temperature in an automobile passenger compartment (not shown). This damper is linked by means of an arm 14 to a rod 16 in turn connected to and movable with a spring loaded diaphragm in a conventional vacuum motor or slave member 18. The vacuum side of the slave member 18 is connected by an output vacuum line 20 to a nipple 22 threaded into a vacuum regulating valve generally indicated at 24. The nipple 22 defines an output port 21 which is surrounded by an annular nipple end surface 23.

The valve 24 is conveniently made of plastic material although it may be fabricated of metal. It consists of a cover or mounting member 26 having two apertures 28 and 30. A second cover 32 is provided with a nipple 34 extended upwardly and through the aperture 30 in the cover 26. The central portion of the second cover 32 has a threaded hub 36 threaded to receive the nipple 22. A circular depending skirt 38 on the second cover 32 extends downwardly into an enlarged portion of a body member 40 of the valve 24. This skirt 38 serves firmly to anchor a marginal portion 42 of a flexible diaphragm generally indicated at 44. This diaphragm is of the rolling type and has its central portion stiffened by a reinforcing metal disk 46. The disk is retained on the diaphragm by portions of the diaphragm being molded in such a way as to extend through suitable openings on the disk. Offset from the axis of the diaphragm 44 is a hole 50 which is closed by the stiffening plate 46 except for a small bleed aperture 54 in the plate. This aperture serves to connect a control vacuum chamber 56 above the diaphragm 44 to a crude vacuum chamber 58 beneath the diaphragm 44. A reduced portion of the valve body 40 defines a recess 60 which accommodates a coil spring 62 retained between the bottom wall of the body 40 and the reinforcing disk 46 of the diaphragm. A nipple 64 is threaded through the bottom of the body 40 and this nipple is provided with a top surface 66 surrounding a port 68 to serve as a seat for an annular surface 70 formed on the diaphragm 44. A depending portion 72 is also made integral with the diaphragm 44 and coaxial with the port 68 to give a metered or more accurate valve adjustment as will be understood. The nipple 64 is connected by a crude vacuum line 74 to a main crude vacuum line 76 leading to the engine intake manifold (not disclosed). The junction of the lines 74 and 76 is connected by a line 78 to the nipple 34, and in the line 78 is placed a restrictor partition 80. An aperture 82 in the line 78 is controlled by a ball valve 84 which in turn is adapted to be operated by a rod 86 connected to a bimetal arrangement of a variable condition detector 88. This detector may take various forms such as, for example, disclosed in SN 611,928, now United States Patent No. 3,373,934, above mentioned. It will be understood that the detector 88 is arranged to be sensitive to temperature condition changes in a passenger compartment which changes are affected by the positioning of the proportioning damper 10. By operation of the detector 88 the extent of vacuum in the line 78 is varied by admitting or shutting off ambient air admitted through the orifice 82. The vacuum in the chamber 56 of the valve 24 may then aptly be termed the control vacuum for operating the control or slave member 18. Ordinarily then, the damper 10 will move or position itself by virtue of the activation of slave member 18 in accordance with the degree of vacuum in the line 78 and as needed to compensate for changes in the condition existent in the passenger compartment.

It has been found, however, that if the crude vacuum in the line 76 should drop unduly, the control vacuum in line 78 also will drop and to an undesirable extent and before the diaphragm 44 will seat on the nipple 22 to freeze or hold the previously acquired angular position of the damper 10. Because of this there heretofore would be an undesirable fluctuation in the output vacuum in the line 20 with a corresponding undesired movement of the damper 10. The present invention eliminates this fluctuation because the facing surfaces of the nipples 22 and 64 are so spaced apart, and this spacing may be adjusted, that the output vacuum line 20 is quickly cut off at the surface 23 when the diaphragm 44 lifts and locks off and holds the output vacuum in the line 20. The motor or slave member 18 remains isolated from the control vacuum of chamber 56 until the crude vacuum supply in line 76 rises above the required control level after which modulation takes place in accordance with the dictates of the detector 88. The only changes in vacuum level at the spring loaded actuator or slave member 18 are those due to the actions of the detector 88, as is desired.

We claim:

1. A vacuum control system for compensating for a variation in a condition such as temperature comprising: a vacuum operated slave member controlling said condition; a vacuum regulating valve; a flexible diaphragm dividing the interior of said valve into a crude vacuum chamber and a control vacuum chamber; means including an input port connecting said crude vacuum chamber to a source of crude vacuum; means for decreasing the strength of said crude vacuum in response to said condition and for admitting it into said control vacuum chamber; output vacuum means including an output port connecting said control vacuum chamber to said slave member; first and second valve elements on opposite sides of said diaphragm in said crude vacuum chamber and in said control vacuum chamber respectively; said ports having annlar surfaces facing one another on opposite sides of said diaphragm and forming input and output seats alternately coactive with said first and second valve elements respectively; spring means normally urging said diaphragm and said second valve element against said output seat to block said output port; a bleed aperture through said diaphragm continuously interconnecting said crude vacuum chamber and said control vacuum chamber; said input and output seats coactive respectively with said first and second valve elements on said diaphragm to close said input port and open said output port upon movement of said diaphragm against the force of said spring means in response to a predetermined pressure differential between said crude vacuum chamber and said control vacuum chamber to prevent the build up of an unnecessarily large vacuum strength in said crude vacuum chamber with respect to the vacuum strength in said control vacuum chamber and whereby said bleed aperture leaks air to said crude vacuum chamber to reduce the strength of vacuum therein and periodically interrupt said predetermined pressure differential between said chambers and unblock said input port.

2. A vacuum control system as set forth in claim 1, having means for adjusting the spacing between said input and output seats.

References Cited

UNITED STATES PATENTS

| | | | |
|---|---|---|---|
| 3,073,345 | 1/1963 | Hagler | 91—447 X |
| 3,433,130 | 3/1969 | Freiberger | 91—447 |
| 208,379 | 9/1878 | Downey | 137—496 |
| 2,584,418 | 2/1952 | Branson | 137—504 |
| 2,950,739 | 8/1960 | Lofink | 92—98 |
| 3,354,902 | 11/1967 | Obermaier | 137—496 |
| 3,373,934 | 3/1968 | Kolbe et al. | 236—13 |

MARTIN P. SCHWADRON, Primary Examiner

IRWIN C. COHEN, Assistant Examiner

U.S. Cl. X.R.

91—447; 236—13